(12) United States Patent
Ito (10) Patent No.: US 8,427,660 B2
(45) Date of Patent: Apr. 23, 2013

(54) IMAGE PROCESSING APPARATUS, IMAGE FORMING APPARATUS, AND COMPUTER READABLE MEDIUM STORING PROGRAM

(75) Inventor: Keiichi Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 415 days.

(21) Appl. No.: 12/876,605

(22) Filed: Sep. 7, 2010

(65) Prior Publication Data

US 2011/0235077 A1   Sep. 29, 2011

(30) Foreign Application Priority Data

Mar. 23, 2010 (JP) ................. 2010-066201

(51) Int. Cl.
*G06F 3/12* (2006.01)
*G06F 11/00* (2006.01)

(52) U.S. Cl.
USPC ............ 358/1.13; 358/1.15; 714/25; 711/125

(58) Field of Classification Search .................... None
See application file for complete search history.

(56) References Cited

U.S. PATENT DOCUMENTS

| | | | | |
|---|---|---|---|---|
| 2006/0221371 A1* | 10/2006 | Ogasawara | ................. | 358/1.13 |
| 2007/0133030 A1* | 6/2007 | Kanamoto | ................... | 358/1.13 |
| 2008/0126860 A1* | 5/2008 | Sampath et al. | ................ | 714/25 |
| 2009/0153892 A1* | 6/2009 | Torii | ............................ | 358/1.13 |
| 2010/0228920 A1* | 9/2010 | Tomi | ............................. | 711/125 |

FOREIGN PATENT DOCUMENTS

| | | |
|---|---|---|
| JP | A 2001-287421 | 10/2001 |
| JP | A 2007-276144 | 10/2007 |
| JP | A 2010-003035 | 1/2010 |

\* cited by examiner

*Primary Examiner* — Satwant Singh
(74) *Attorney, Agent, or Firm* — Oliff & Berridge, PLC (57) ABSTRACT

An image processing apparatus includes a first dynamic reconfigurable processor, a second dynamic reconfigurable processor, and a controller. The first dynamic reconfigurable processor is assigned to a first group of image processing operations that are executed regardless of whether or not correction data from a printer is used. The second dynamic reconfigurable processor is assigned to a second group of image processing operations that are executed using correction data from the printer. The controller performs control to execute the first group of image processing operations during interruption of operation of the printer by changing an image processing setting so as to cause the second dynamic reconfigurable processor assigned to the second group of image processing operations to execute the first group of image processing operations.

6 Claims, 13 Drawing Sheets

| WORKSTATION NO. | HARDWARE ACCELERATOR NO. | DRAWING PROCESSOR NO. | FUNCTION |
|---|---|---|---|
| 3A | 13A-1 | 22-1 | RIP-ASSIST (EXPANSION PROCESS) |
| 3A | 13A-1 | 22-2 | RIP-ASSIST (REDUCTION PROCESS) |
| 3A | 13A-1 | 22-3 | RIP-ASSIST (ROTATION PROCESS) |
| ⋮ | ⋮ | ⋮ | ⋮ |
| 3A | 13A-1 | 22-N | RIP-ASSIST (SCREEN PROCESS) |
| 3A | 13A-2 | 22-1 TO 22-N | PAGE CREATION |
| ⋮ | ⋮ | ⋮ | ⋮ |
| 3A | 13A-N | 22-1 TO 22-N | PAGE CREATION |

FIG. 8

FIG. 9A  HARDWARE ACCELERATOR 13A-1

FIG. 9B  HARDWARE ACCELERATORS 13A-2 TO 13A-N

FIG. 9C  PRINTER I/F BOARD 14A

FIG. 10A

| WORKSTATION NO. | HARDWARE ACCELERATOR NO. | DRAWING PROCESSOR NO. | FUNCTION |
|---|---|---|---|
| 3A | 13A-1 | 22-1 | RIP-ASSIST (EXPANSION PROCESS) |
| 3A | 13A-1 | 22-2 | RIP-ASSIST (REDUCTION PROCESS) |
| 3A | 13A-1 | 22-3 | RIP-ASSIST (ROTATION PROCESS) |
| ⋮ | ⋮ | ⋮ | ⋮ |
| 3A | 13A-1 | 22-N | RIP-ASSIST (COMPRESSION PROCESS) |
| 3A | 13A-2 | 22-1 | RIP-ASSIST (EXPANSION PROCESS) |
| 3A | 13A-2 | 22-2 | RIP-ASSIST (REDUCTION PROCESS) |
| 3A | 13A-2 | 22-3 | RIP-ASSIST (ROTATION PROCESS) |
| ⋮ | ⋮ | ⋮ | ⋮ |
| 3A | 13A-1 | 22-N | RIP-ASSIST (COMPRESSION PROCESS) |
| ⋮ | ⋮ | ⋮ | ⋮ |
| 3A | 13A-N | 22-1 | RIP-ASSIST (EXPANSION PROCESS) |
| ⋮ | ⋮ | ⋮ | ⋮ |

FIG. 10B

| WORKSTATION NO. | HARDWARE ACCELERATOR NO. | DRAWING PROCESSOR NO. | FUNCTION |
|---|---|---|---|
| 3A | 13A-1 | 22-1 | RIP-ASSIST (SECOND EXPANSION PROCESS) |
| 3A | 13A-1 | 22-2 | RIP-ASSIST (CALIBRATION PROCESS) |
| 3A | 13A-1 | 22-3 | RIP-ASSIST (FILTERING PROCESS) |
| ⋮ | ⋮ | ⋮ | ⋮ |
| 3A | 13A-1 | 22-N | RIP-ASSIST (PAGE IMPOSITION PROCESS) |
| 3A | 13A-2 | 22-1 | RIP-ASSIST (SECOND EXPANSION PROCESS) |
| 3A | 13A-2 | 22-2 | RIP-ASSIST (CALIBRATION PROCESS) |
| 3A | 13A-2 | 22-3 | RIP-ASSIST (FILTERING PROCESS) |
| ⋮ | ⋮ | ⋮ | ⋮ |
| 3A | 13A-1 | 22-N | RIP-ASSIST (PAGE IMPOSITION PROCESS) |
| ⋮ | ⋮ | ⋮ | ⋮ |
| 3A | 13A-N | 22-1 | RIP-ASSIST (SECOND EXPANSION PROCESS) |
| ⋮ | ⋮ | ⋮ | ⋮ |

FIG. 11A  HARDWARE ACCELERATOR 13A-1

FIG. 11B  HARDWARE ACCELERATORS 13A-2 TO 13A-N

FIG. 11C  PRINTER I/F BOARD 14A

FIG. 12

IMAGE PROCESSING APPARATUS, IMAGE FORMING APPARATUS, AND COMPUTER READABLE MEDIUM STORING PROGRAM

CROSS-REFERENCE TO RELATED APPLICATIONS

This application is based on and claims priority under 35 USC 119 from Japanese Patent Application No. 2010-066201 filed Mar. 23, 2010.

BACKGROUND (i) Technical Field

The present invention relates to an image processing apparatus, an image forming apparatus, and a computer readable medium storing a program.

SUMMARY

According to an aspect of the invention, there is provided an image processing apparatus including a first dynamic reconfigurable processor, a second dynamic reconfigurable processor, and a controller. The first dynamic reconfigurable processor is assigned to a first group of image processing operations that are executed regardless of whether or not correction data from a printer is used. The second dynamic reconfigurable processor is assigned to a second group of image processing operations that are executed using correction data from the printer. The controller performs control to execute the first group of image processing operations during interruption of operation of the printer by changing an image processing setting so as to cause the second dynamic reconfigurable processor assigned to the second group of image processing operations to execute the first group of image processing operations.

BRIEF DESCRIPTION OF THE DRAWINGS

Exemplary embodiment(s) of the present invention will be described in detail based on the following figures, wherein.

DETAILED DESCRIPTION

An exemplary embodiment of the present invention will be described hereinafter with reference to the drawings.

Figure 1:
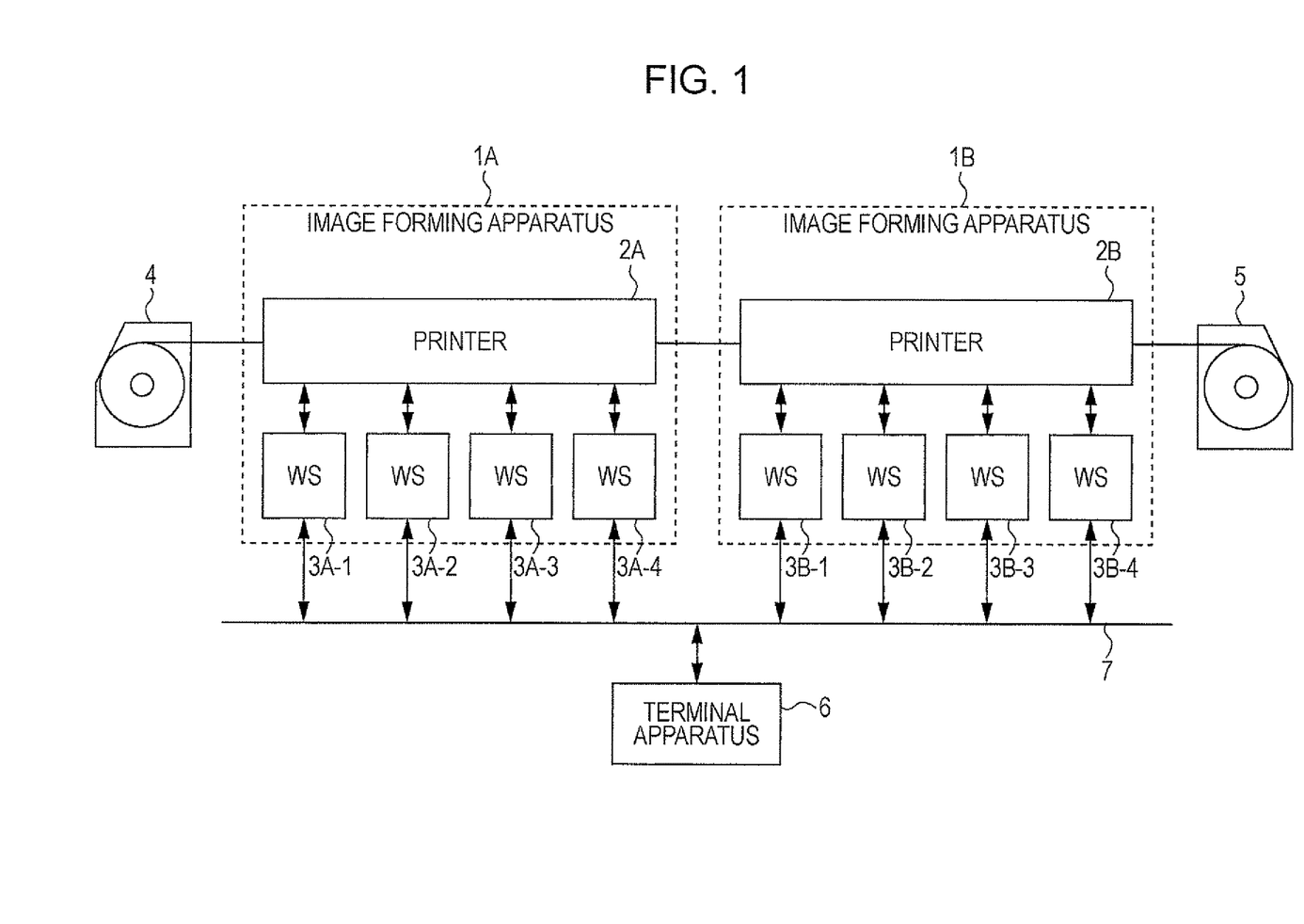
FIG. 1 is a block diagram illustrating the configuration of a system including an image forming apparatus according to an exemplary embodiment.

FIG. 1 is a block diagram illustrating the configuration of a system including an image forming apparatus according to the exemplary embodiment.

The system illustrated in FIG. 1 includes image forming apparatuses 1A and 1B, a pre-processing apparatus 4, a post-processing apparatus 5, and a terminal apparatus 6 (instruction unit). The image forming apparatuses 1A and 1B may be professional large format printing systems, and include printers 2A and 2B and workstations 3A-1 to 3A-4 and 3B-1 to 3B-4, respectively. The number of workstations connected to each printer is not limited to four, and may be at least one. In the following description, plural elements having the same function are specified by a single reference numeral unless specifically identified. For example, the workstations 3A-1 to 3A-4 and 3B-1 to 3B-4 are referred to as "workstations 3A" and "workstations 3B", respectively.

The workstations 3A and 3B may be computers, and are connected to the terminal apparatus 6 via a network 7. The terminal apparatus 6 may be connected to the workstations 3A and 3B via a high-speed data transfer medium. The workstations 3A and 3B may also be connected to the printers 2A and 2B, respectively, via a high-speed data transfer medium.

The pre-processing apparatus 4 holds continuous paper wound in a roll (hereinafter referred to as "roll paper"), and transports the roll paper to the printer 2A. The printer 2A prints image data, text data, or other desired data on the front side of the roll paper, and outputs the printed roll paper. The roll paper output from the printer 2A is reversed and is input to the printer 2B. The printer 2B prints image data, text data, or other desired data on the back side of the roll paper, and outputs the roll paper to the post-processing apparatus 5. The post-processing apparatus 5 rewinds the roll paper output from the printer 2B.

The terminal apparatus 6 generates a print job to be printed on the roll paper by the printers 2A and 2B, and a printing instruction, and transmits the print job and the printing instruction to the workstations 3A and 3B via the network 7. The workstations 3A and 3B receive the print job and printing instruction transmitted from the terminal apparatus 6, and convert the print job into raster image data that can be printed by the printers 2A and 2B. Further, the workstations 3A and 3B control the printing operation of the printers 2A and 2B so that the raster image data is printed on the roll paper by the printers 2A and 2B. Raster data represents grids of values of pixels into which an image is divided, indicating the color or density of the pixels, using a color system such as an RGB color system based on red, green, and blue or a YMCK color system based on yellow, magenta, cyan, and black. The printers 2A and 2B print image data, text data, and other desired data on the roll paper in accordance with the printing instruction under the control of the workstations 3A and 3B, respectively.

The printers 2A and 2B may form, for example, image data, text data, or other desired data for two pages of A4 size in the width direction of the roll paper. Further, the printers 2A and 2B may print, for example, image data, text data, or other desired data of A4 size in a continuous manner in the direction in which the roll paper is transported. The printers 2A and 2B may be color printers or monochrome printers.

Figure 2:
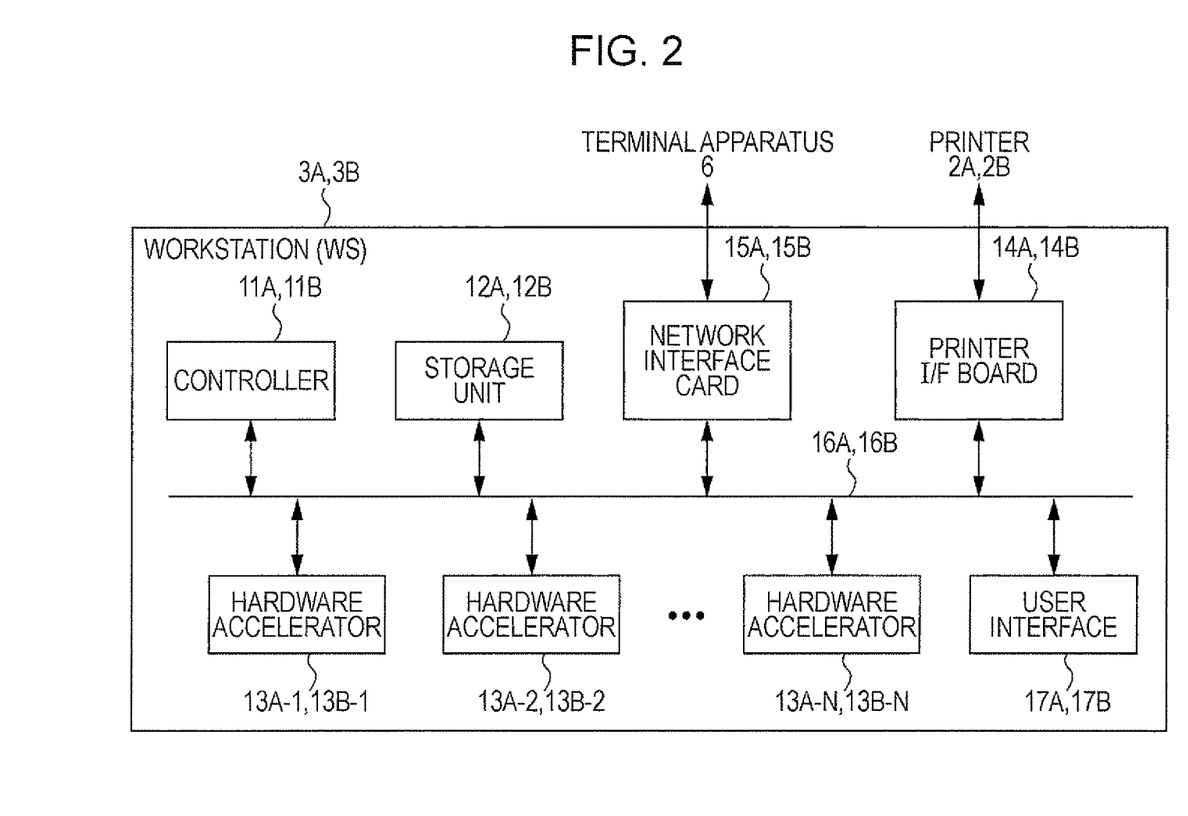
FIG. 2 is a configuration diagram of a workstation.

FIG. 2 is a configuration diagram of the workstations 3A and 3B. In FIG. 2, elements of the workstation 3B are represented by numbers in parentheses.

The workstation 3A includes a controller 11A (changing unit, execution unit), a storage unit 12A, hardware accelerators 13A-1 to 13A-N, where N is a natural number, a printer interface (I/F) board 14A, a network interface card (NIC) 15A, and a user interface (UI) 17A (instruction unit). Similarly, the workstation 3B includes a controller 11B (changing unit, execution unit), a storage unit 12B, hardware accelerators 13B-1 to 13B-N, a printer interface (I/F) board 14B, a network interface card (NIC) 15B, and a UI 17B (instruction unit). The configuration of the workstation 3B is similar to the configuration of the workstation 3A, and a description thereof is thus omitted.

The controller 11A may be formed of a central processing unit (CPU), and is connected to the storage unit 12A, the hardware accelerators 13A-1 to 13A-N, the printer I/F board 14A, the network interface card (NIC) 15A, and the UI 17A via a bus 16A. The controller 11A controls the operation of the storage unit 12A, the hardware accelerators 13A-1 to 13A-N, the printer I/F board 14A, the network interface card (NIC) 15A, and the UI 17A. Further, the controller 11A communicates with the controller 11B of the workstation 3B via the network interface card (NIC) 15A.

The network interface card 15A receives a print job transmitted from the terminal apparatus 6. The hardware accelerators 13A-1 to 13A-N perform various image processing operations, which have been specified, on the print job to convert the print job into raster image data that can be printed by the printer 2A, and store the raster image data in the storage unit 12A. The hardware accelerators 13A-1 to 13A-N are capable of communicating with the hardware accelerators 13B-1 to 13B-N of the workstation 3B via the network interface card (NIC) 15A. The storage unit 12A may be implemented by a memory, a hard disk drive, or any other suitable device. The printer I/F board 14A performs predetermined processing on the print data subjected to the image processing operations, which is stored in the storage unit 12A, and transfers the resulting print data to the printer 2A. The predetermined processing may include a calibration process for performing tone correction of image data using correction data from the printer 2A, and a protocol selection process for selecting a protocol to be used to transfer the print data.

The UI 17A may be used for setting data, table information, or any other suitable data stored in the storage unit 12A or for controlling the operation of the printer 2A.

Figure 3:
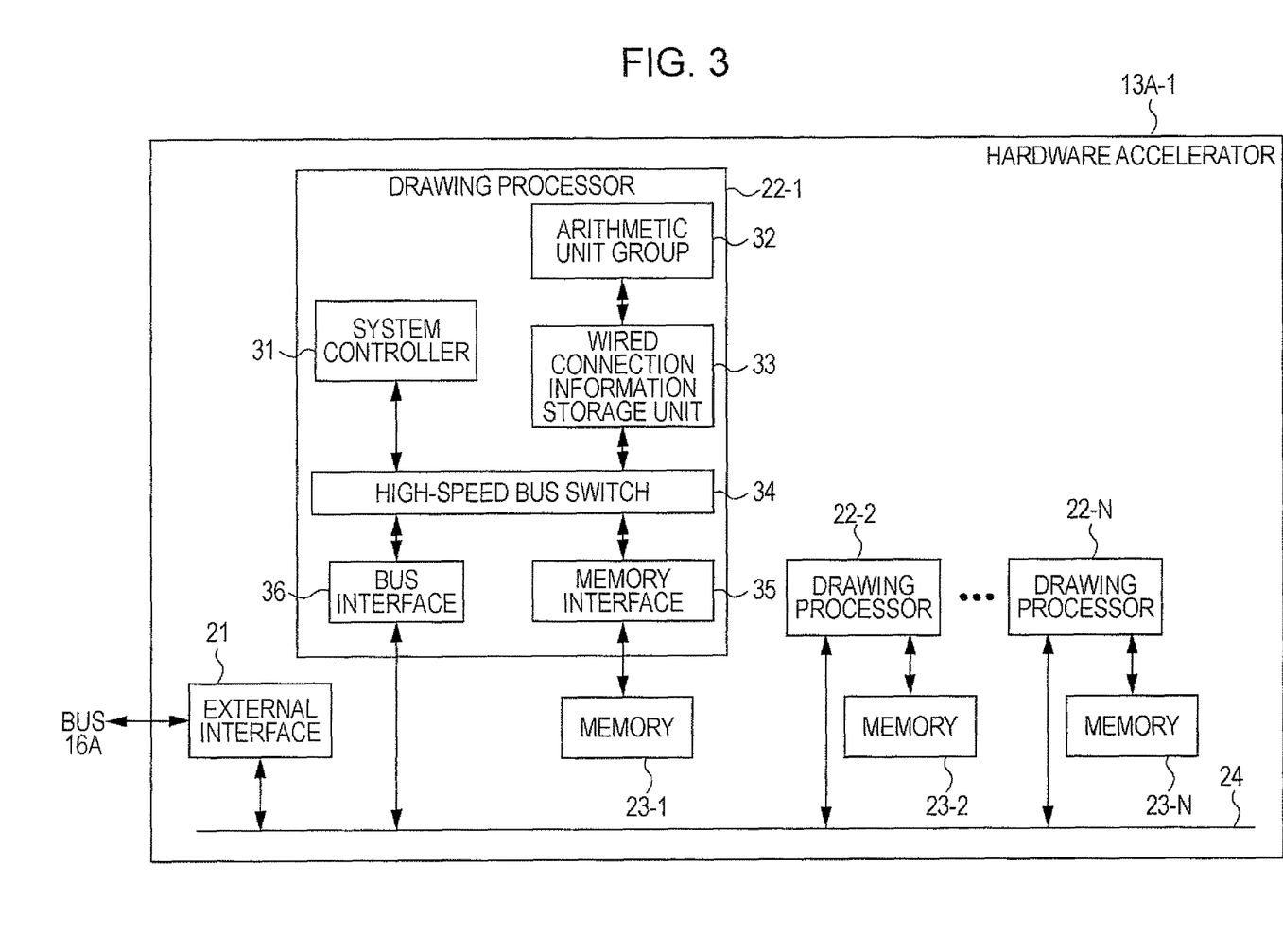
FIG. 3 illustrates the configuration of a hardware accelerator.

FIG. 3 is a diagram illustrating the configuration of the hardware accelerator 13A-1. The configuration of the hardware accelerators 13A-2 to 13A-N and 13B-1 to 13B-N is similar to the configuration of the hardware accelerator 13A-1.

The hardware accelerator 13A-1 may serve as a RIP-assist board for assisting a software-based raster image processor (RIP). The hardware accelerator 13A-1 may also serve as a page creation board for creating a page of a specified size (for example, A4 size) on roll paper.

The hardware accelerator 13A-1 includes an external interface 21, drawing processors 22-1 to 22-N, where N is a natural number, and memories 23-1 to 23-N. The drawing processors 22-1 to 22-N are connected to the external interface 21 via a bus 24. The drawing processors 22-1 to 22-N are connected to the memories 23-1 to 23-N, respectively.

The external interface 21 may be a communication interface provided between the bus 16A illustrated in FIG. 2 and the bus 24. The external interface 21 executes data communication between the controller 11A illustrated in FIG. 2 and the drawing processors 22-1 to 22-N.

Next, the configuration of the drawing processor 22-1 will be described. The configuration of the drawing processors 22-2 to 22-N is similar to the configuration of the drawing processor 22-1.

The drawing processor 22-1 may be a processor (dynamic reconfigurable processor) capable of dynamically replacing its on-chip circuit configuration. In response to an instruction for performing multiple image processing operations, the drawing processor 22-1 repeatedly executes a process of replacing the circuit configuration. For example, after the end of the initial image processing operation, the drawing processor 22-1 may replace the on-chip circuit configuration to support the next image processing operation. The drawing processor 22-1 includes a system controller 31, an arithmetic unit group 32, a wired connection information storage unit 33, a high-speed bus switch 34, a memory interface 35, and a bus interface 36.

The arithmetic unit group 32 may include various arithmetic units such as an adder and a multiplier. The wired connection information storage unit 33 stores plural pieces of wired connection information for implementing image processing requested from the controller 11A by combining various arithmetic units included in the arithmetic unit group 32. The plural pieces of wired connection information are read from the memory 23-1, and are stored in the wired connection information storage unit 33.

The system controller 31 executes a requested image processing by selecting one of the pieces of wired connection information stored in the wired connection information storage unit 33 in accordance with an image processing command (image processing request) from the controller 11A and by combining various arithmetic units included in the arithmetic unit group 32 in accordance with the selected piece of wired connection information. Therefore, even upon receipt of an instruction for performing plural image processing operations, the drawing processor 22-1, which may be a dynamic reconfigurable processor, executes the requested plural image processing operations only by appropriately changing wired connection information. Thus, the chip area is smaller than that in a field programmable gate array (FPGA) or application specific integrated circuit (ASIC) processor. In the exemplary embodiment, dynamic reconfigurable processors are used as the drawing processors 22. However, FPGA or ASIC processors may be used as the drawing processors 22.

The high-speed bus switch 34 may be a bus switch that allows quick switching of a data path among the system controller 31, the arithmetic unit group 32, the memory interface 35, and the bus interface 36. The memory interface 35 may be an interface for transmitting and receiving data between the memory 23-1 and the high-speed bus switch 34. The bus interface 36 may be an interface for transmitting and receiving data between the bus 24 and the high-speed bus switch 34. The memory 23-1 stores connection information described below, a table, and other suitable data.

With the use of the above configuration, the drawing processor 22-1 implements image processing specified in an image processing command from the controller 11A.

Figure 4:
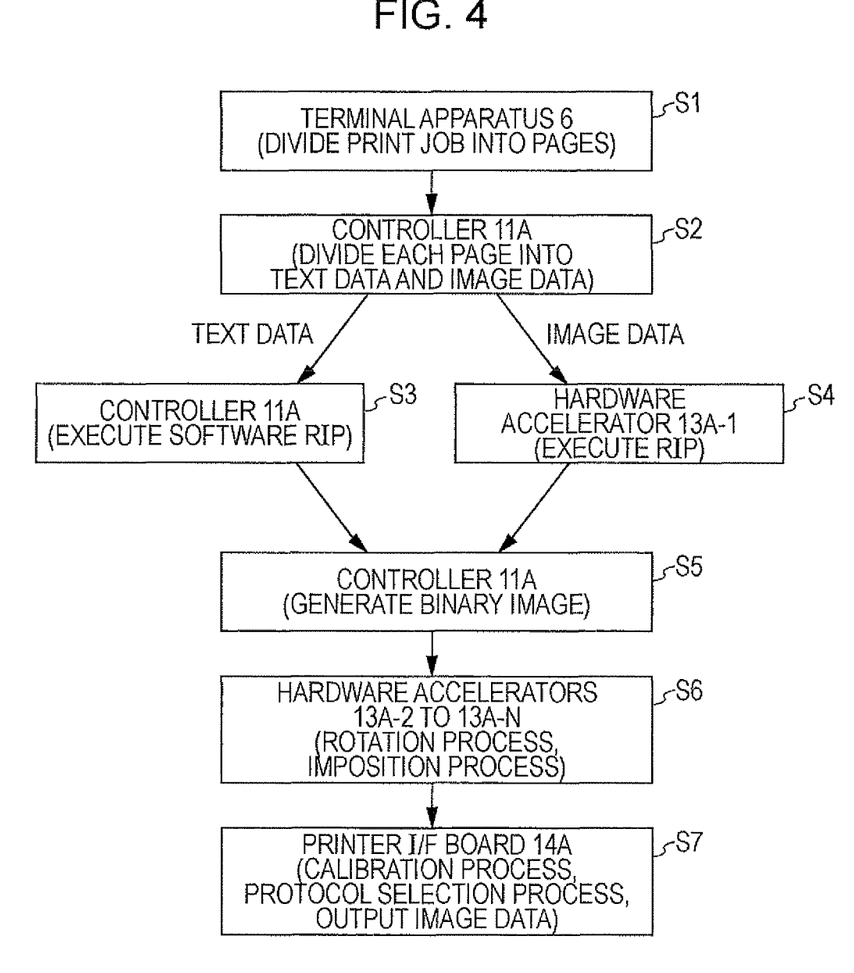
FIG. 4 is a flowchart illustrating a process executed by a terminal apparatus and a workstation.

FIG. 4 is a flowchart illustrating a process executed by the terminal apparatus 6 and the workstation 3A. The process illustrated in FIG. 4 may also be executed by the workstation 3B.

First, the terminal apparatus 6 receives a print job, and divides the print job into pages (step S1). Then, the controller 11A divides data included in each page into text data and image data (step S2). The controller 11A executes a RIP process by software on the obtained text data (step S3). The hardware accelerator 13A-1 executes a RIP process on the obtained image data (step S4). Plural hardware accelerators may execute the processing of step S4. The RIP process performed in step S4 may include various image processing such as a Joint Photographic Experts Group (JPEG) expansion process, an enlargement/reduction process, and a color space conversion process. Then, in step S4, a RIP-processed raw image in YMCK format is generated.

Then, the controller 11A receives the RIP-processed image data, and combines the RIP-processed image data with the text data on which a RIP process has been performed by software to generate binary images of respective YMCK colors (step S5).

The hardware accelerators 13A-2 to 13-N receive image data for one page, which forms a binary image, and executes a rotation process or an imposition process (a process for defining a layout of, for example, two pages of image data of A4 size in an A3-size region) on the received image data (step S6).

Finally, the printer I/F board 14A receives image data on which a rotation process or an imposition process has been performed from the hardware accelerators 13A-2 to 13-N, and executes a calibration process for performing tone correction of the received image data using correction data from the printer 2A and a protocol selection process for selecting a protocol to be used to transfer the print data. Then, the printer I/F board 14A transmits image data on which all the processes have been performed to the printer 2A (step S7).

Figure 5:
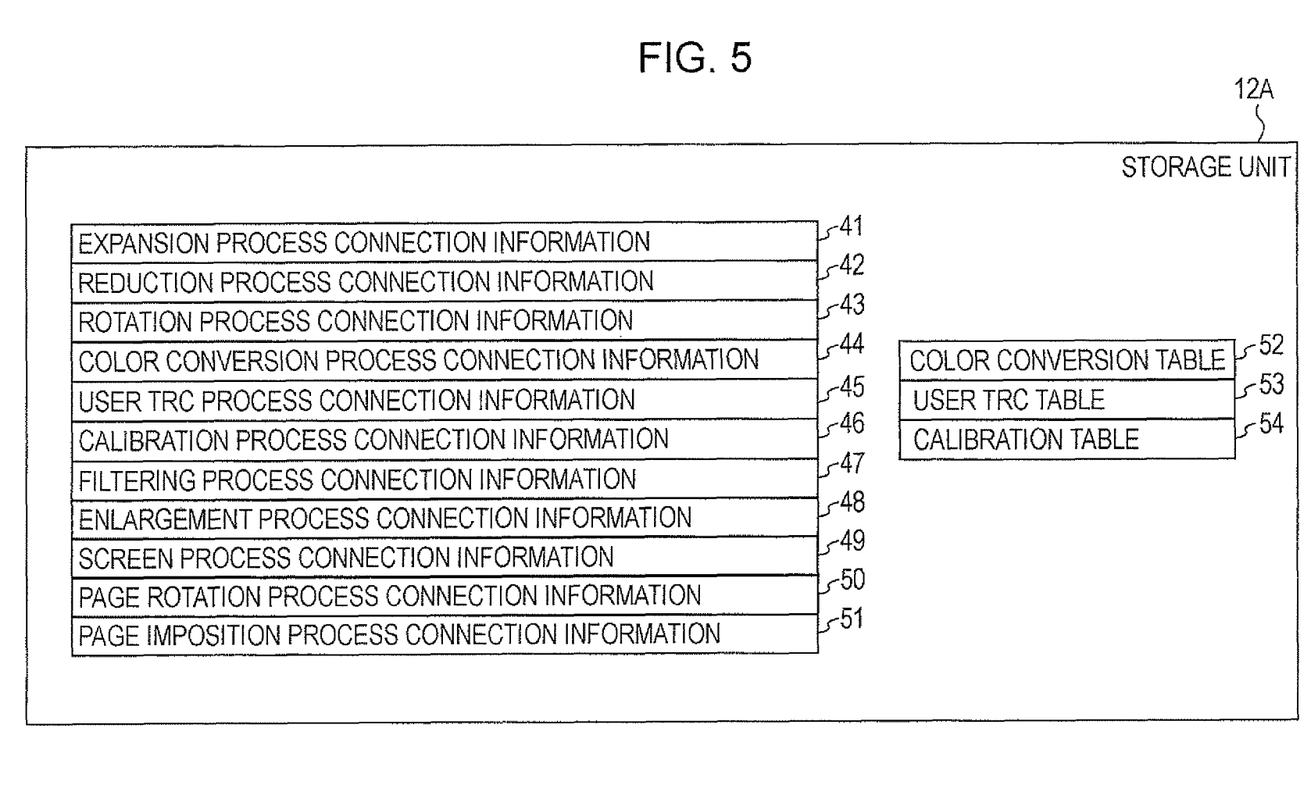
FIG. 5 illustrates an example of data stored in a storage unit.

FIG. 5 is a diagram illustrating an example of data stored in the storage unit 12A. The storage unit 12B stores similar data.

As illustrated in FIG. 5, the storage unit 12A includes expansion process connection information 41, reduction process connection information 42, rotation process connection information 43, color conversion process connection information 44, user tone reproduction curve (TRC) process connection information 45, calibration process connection information 46, filtering process connection information 47, enlargement process connection information 48, screen process connection information 49, page rotation process connection information 50, and page imposition process connection information 51. Further, the storage unit 12A includes a color conversion table 52, a user TRC table 53, and a calibration table 54. Each connection information includes the wired connection information described above, parameters for determining the operation of the drawing processors 22, and other suitable data.

The connection information and tables described above are used by the drawing processors 22. The expansion process connection information 41 may be used in a process for expanding image data such as a JPEG expansion process. The reduction process connection information 42 may be used when the drawing processors 22 reduce image data. The rotation process connection information 43 may be used when the drawing processors 22 rotate image data.

The color conversion process connection information 44 and the color conversion table 52 may be used when the drawing processors 22 execute color conversion of image data. For example, the drawing processors 22 convert the RGB components of image data into the CMY components in accordance with the color conversion table 52. The user TRC process connection information 45 and the user TRC table 53 may be used when the drawing processors 22 perform tone correction of image data. For example, the drawing processors 22 perform tone correction of image data in accordance with a tone correction curve in the user TRC table 53, which is specified by the user.

The calibration process connection information 46 and the calibration table 54 may be used when the drawing processors 22 execute a calibration process on image data. The calibration process is a process for performing tone correction of image data to compensate for the effect of environmental change or aging change on the printer 2A. The calibration table 54 is updated when the drawing processors 22 receive correction data from the printer 2A at a predetermined timing (such as at the time of the start of a print job). The filtering process connection information 47 may be used when the drawing processors 22 remove noise in image data.

The enlargement process connection information 48 may be used when the drawing processors 22 enlarge image data to a specified size. The screen process connection information 49 may be used when the drawing processors 22 convert multivalued image data of the CMY components and multivalued image data of the K component into binary image data of the CMYK components. The page rotation process connection information 50 may be used when the drawing processors 22 rotate image data for one page. The page imposition process connection information 51 may be used when the drawing processors 22 define a layout of each page of image data in a predetermined region.

When the controller 11A outputs an image processing request to the drawing processor 22-1, connection information including wired connection information and a table, which are specified by the image processing request, are output together to the drawing processor 22-1, and are stored in the memory 23-1. The connection information stored in the memory 23-1 is stored in the wired connection information storage unit 33 by using the system controller 31. The system controller 31 selects a piece of wired connection information stored in the wired connection information storage unit 33 in accordance with the image processing request, and combines various arithmetic units included in the arithmetic unit group 32 in accordance with the selected piece of wired connection information to create a circuit that executes the corresponding image processing operation. Then, the requested image processing is executed. In image processing that requires a table, the system controller 31 reads a table from the memory 23-1, as desired.

Figures 6A, 6B:
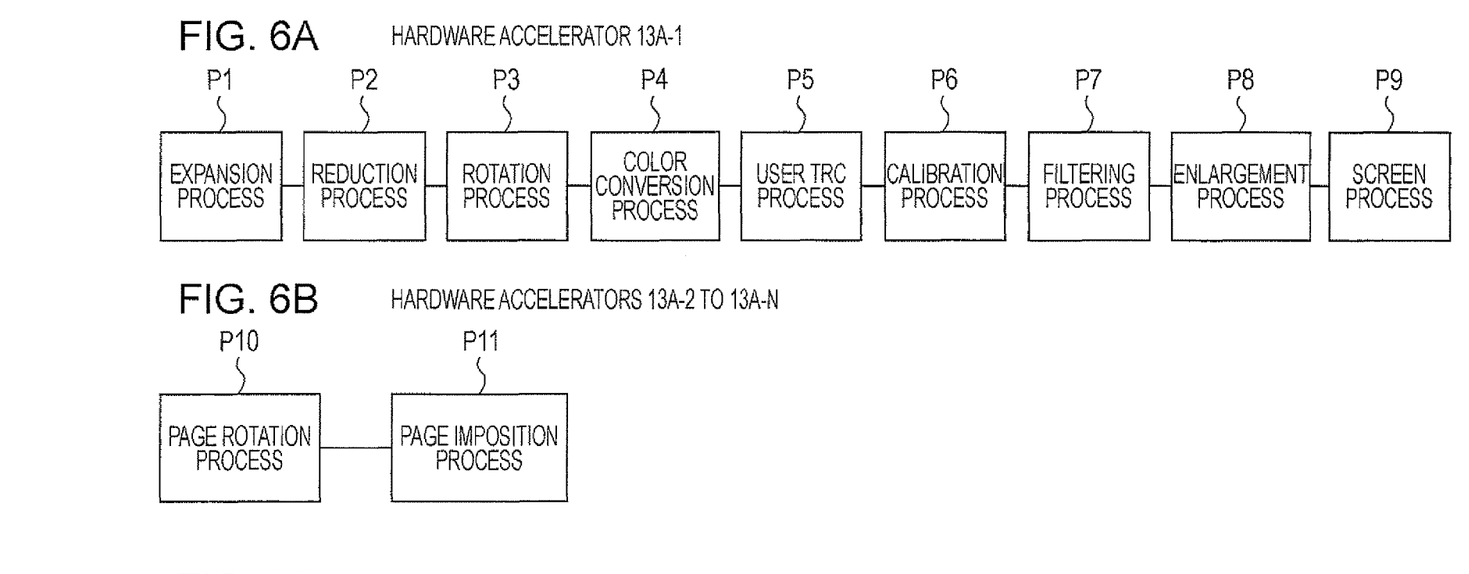
FIG. 6A is a sequence diagram illustrating an example of image processing executed by a hardware accelerator.
FIG. 6B is a sequence diagram illustrating an example of image processing executed by other hardware accelerators.
Figure 6C:
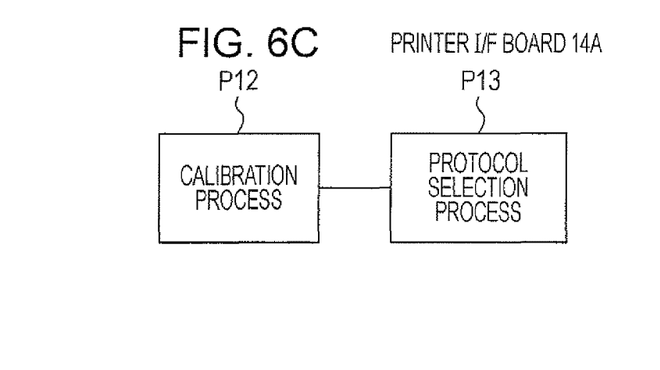
FIG. 6C is a sequence diagram illustrating an example of processes executed by a printer I/F board.

FIG. 6A is a sequence diagram illustrating an example of image processing executed by the hardware accelerator 13A-1. FIG. 6B is a sequence diagram illustrating an example of image processing executed by the hardware accelerators 13A-2 to 13A-N. FIG. 6C is a sequence diagram illustrating an example of processes executed by the printer I/F board 14A.

In FIG. 6A, the hardware accelerator 13A-1 functions as a RIP-assist board (hereinafter referred to as a "RIP-assist function") for assisting a software-based RIP, and executes a RIP process on image data. RIP processes executed using the RIP-assist function include an expansion process (P1) using the expansion process connection information 41, a reduction process (P2) using the reduction process connection information 42, a rotation process (P3) using the rotation process connection information 43, a color conversion process (P4) using the color conversion process connection information 44 and the color conversion table 52, a user TRC process (P5) using the user TRC process connection information 45 and the user TRC table 53, a calibration process (P6) using the calibration process connection information 46 and the calibration table 54, a filtering process (P7) using the filtering process connection information 47, an enlargement process (P8) using the enlargement process connection information 48, and a screen process (P9) using the screen process connection information 49. The calibration table 54 may be a lookup table in which color data of each color of an input image is associated with color data of the corresponding color of an output image. As described above, the drawing processors 22 included in the hardware accelerator 13A-1 execute requested plural image processing operations merely by appropriately changing wired connection information. Thus, after the end of each of the processes P1 to P8, the drawing processors 22 sequentially replace the on-chip circuit configuration to support the next process.

In FIG. 6B, each of the hardware accelerators 13A-2 to 13A-N functions as a page creation board (hereinafter referred to as a "page creation function") for creating a page of a specified size (for example, A4 size) on roll paper. Processes executed using the page creation function include a page rotation process (P10) using the page rotation process connection information 50, and a page imposition process (P11) using the page imposition process connection information 51.

In FIG. 6C, processes executed by the printer I/F board 14A include a calibration process (P12) for performing tone correction of image data received from the hardware accelerators 13A-2 to 13-N in accordance with correction data from the printer 2A, and a protocol selection process (P13) for selecting a protocol to be used to transfer the print data.

Plural hardware accelerators may serve as RIP-assist boards, or a single hardware accelerator may serve as a page creation board.

A user sets the above image processing operations (P1 to P13) and the processing order in the controller 11A through the UI 17A or the terminal apparatus 6. The image processing operations and the processing order are saved in the storage unit 12A as setting information. The setting information is represented in the sequence diagrams illustrated in FIGS. 6A to 6C. Upon receipt of a print job from the terminal apparatus 6, the controller 11A reads setting information from the storage unit 12A, and sequentially outputs the connection information and table corresponding to the set image processing operations to a hardware accelerator 13A that is specified by a database described below in accordance with the setting information. Setting information, which may be set using a sequence diagram, allows a user to easily recognize image processing operations executed by the hardware accelerator 13A and the printer I/F board 14A and the processing order.

Figure 7:
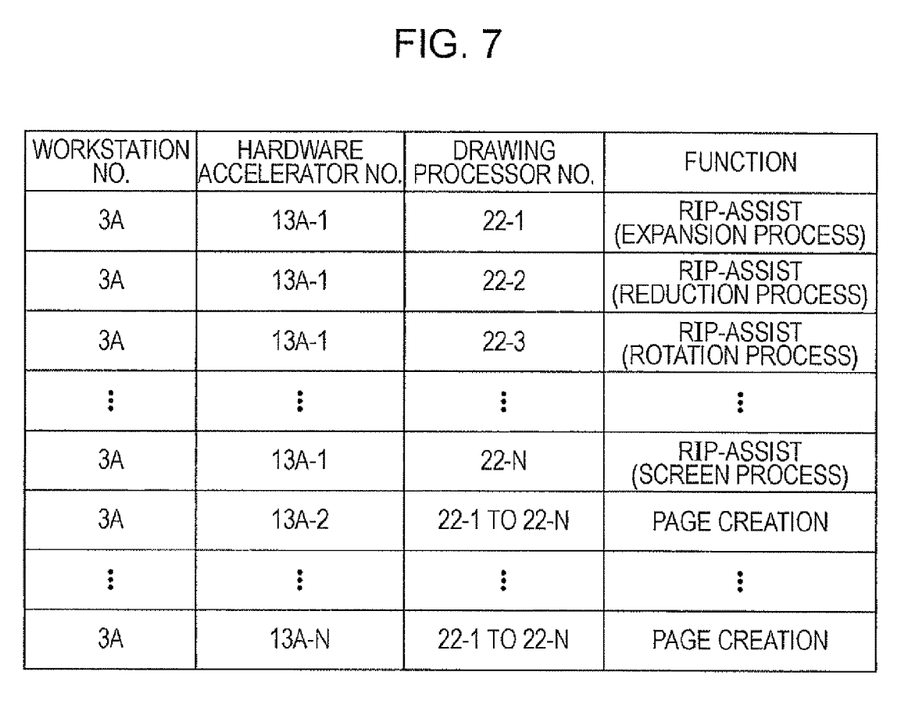
FIG. 7 is a database illustrating the relationship between the workstation, hardware accelerator, and drawing processor numbers, and functions.

FIG. 7 illustrates a database representing the relationship between the workstation, hardware accelerator, and drawing processor numbers, and functions.

The database illustrated in FIG. 7 is stored in the storage unit 12A, and is set using the UI 17A provided in the workstation 3A or using the terminal apparatus 6. Further, the database illustrated in FIG. 7 may be edited using the UI 17A or the terminal apparatus 6. The database is also stored in the storage unit 12B.

As illustrated in FIG. 7, the database describes the relationship between the numbers of the hardware accelerators and drawing processors included in all the workstations, and functions. In FIG. 7, all the drawing processors 22-1 to 22-N included in the hardware accelerator 13A-1 are assigned the RIP-assist function for the front side of the roll paper. Further, all the drawing processors 22-1 to 22-N included in each of the hardware accelerators 13A-2 to 13A-N are assigned the page creation function.

In accordance with the database, the controller 11A assigns each hardware accelerator 13A and each drawing processor 22 to the image processing operations included in the RIP-assist function or to the image processing operations included in the page creation function.

Figure 8:
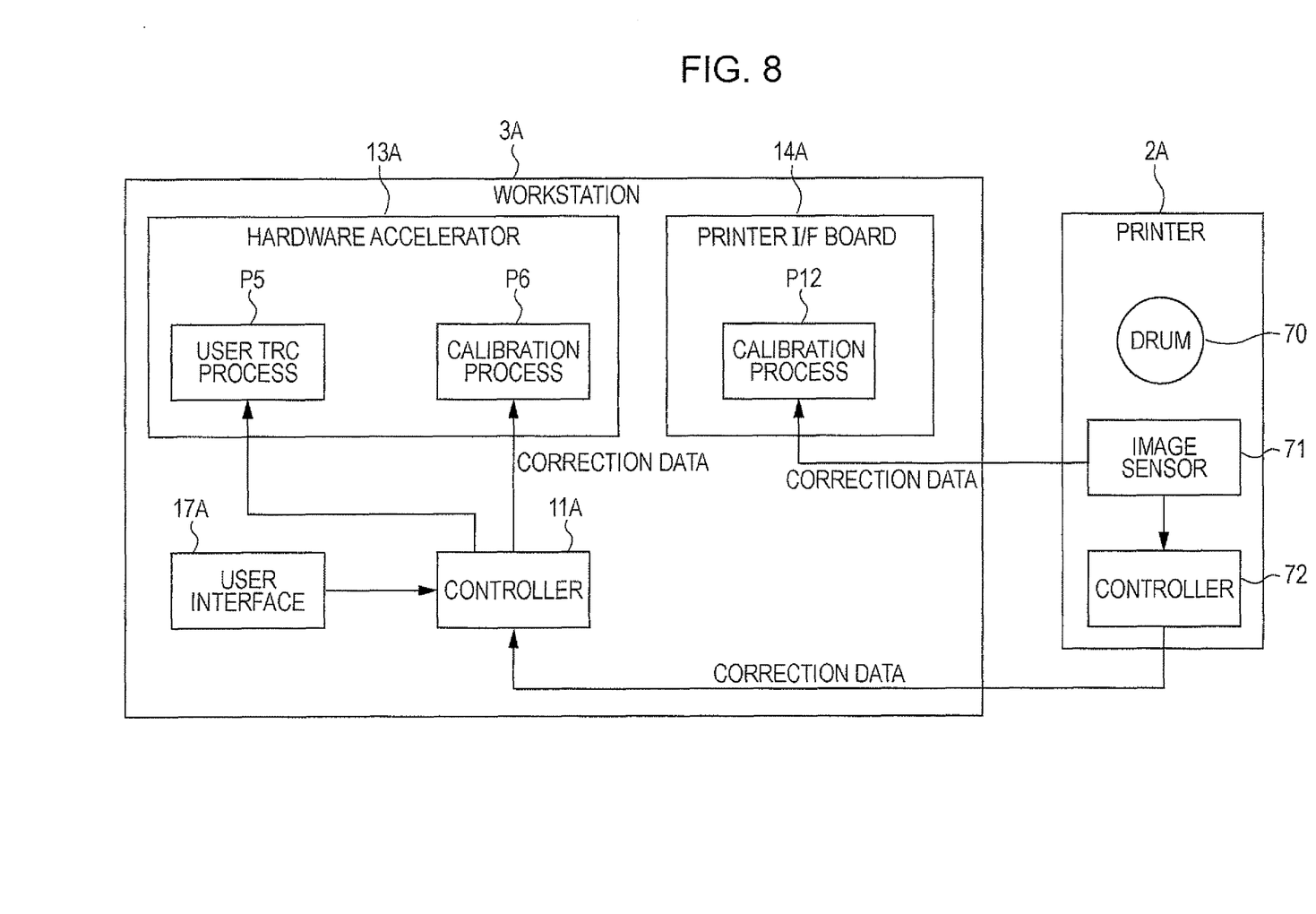
FIG. 8 is a schematic configuration diagram of a workstation that executes a user tone reproduction curve (TRC) process and calibration processes, and a printer.

FIG. 8 is a schematic configuration diagram of the workstation 3A that executes the user TRC process (P5) and the calibration processes (P6 and P12), and the printer 2A. The schematic configuration of the workstation 3B and the printer 2B is similar to that in FIG. 8.

The printer 2A includes a drum 70, an image sensor 71 configured to read a printed patch for calibration, which is created in a region other than a region where pages are created on roll paper, and a controller 72 that creates correction data for calibration using the read printed patch. In the exemplary embodiment, the controller 72 has in advance a master lookup table (LUT) of each color component. Then, the controller 72 creates a calibration process LUT (correction data for tone correction) of each color component by using the printed patch of the corresponding color component read by the image sensor 71 and the master LUT of the corresponding color component using an existing technique.

In the user TRC process (P5), a user changes the tone correction curve in the user TRC table 53 using the UI 17A to thereby perform tone correction of image data.

In the calibration process (P6), the controller 11A receives the calibration process LUT created by the controller 72 in the printer 2A, and updates the calibration table 54 using the calibration process LUT. The calibration table 54 is updated at a predetermined timing (such as at the time of the start of a print job).

In the calibration process (P12), the printer I/F board 14A performs tone correction of image data received from the hardware accelerators 13A-2 to 13-N by using the printed patch read from the image sensor 71. Specifically, the printer I/F board 14A corrects the image data in real time using the data of the printed patch read from the image sensor 71 to address the periodic variation of the drum 70 and the difference in density between plural colors.

In this manner, the calibration process (P6) and the calibration process (P12) are processes for performing tone correction of image data using correction data for tone correction from the printer 2A.

Hereinafter, processes executed in the workstation 3A before replacement of roll paper, during replacement of roll paper, and after replacement of roll paper will be described.

Before replacement of roll paper, the controller 11A causes the drawing processors 22 included in the hardware accelerators 13A or the printer I/F board 14A to execute image processing in accordance with the setting information illustrated in FIGS. 6A to 6C.

Conventionally, if a shortage of roll paper occurs during printing, the controller 11A outputs an image processing interruption signal to the hardware accelerators 13A and the printer I/F board 14A. When the replacement of roll paper is completed, the controller 11A outputs an image processing restart signal to the hardware accelerators 13A and the printer I/F board 14A. Therefore, interrupted image processing is restarted in accordance with the setting information illustrated in FIGS. 6A to 6C.

However, in the calibration processes (P6 and P12), tone correction of image data after the replacement of roll paper is performed using correction data from the printer 2A before the replacement of roll paper. Thus, a color difference (difference in color density) between output images before and after the replacement of roll paper may occur.

Therefore, in the exemplary embodiment, at the time of the replacement of roll paper, the controller 11A divides plural image processing operations included in setting information obtained before the replacement of roll paper into a first group including image processing operations that are executed regardless of whether or not correction data from the printer 2A is used and a second group including image processing operations that are executed using correction data from the printer 2A. During replacement of roll paper, the controller 11A changes the setting information obtained before the replacement of roll paper to first setting information including the first group. After the replacement of roll paper, the controller 11A changes the first setting information to second setting information including the second group. Then, after the replacement of roll paper, the controller 11A causes the drawing processors 22 or the printer I/F board 14A to perform tone correction of the image data using correction data from the printer 2A after the replacement of roll paper. Alternatively, in accordance with an instruction from the UI 17A or the terminal apparatus 6, the controller 11A may also divide plural image processing operations included in setting information obtained before the replacement of roll paper into the first group and the second group. In accordance with the instruction from the UI 17A or the terminal apparatus 6, furthermore, the controller 11A may change the setting information obtained before the replacement of roll paper to first setting information including the first group during replacement of roll paper, and change the first setting information to second setting information including the second group after the replacement of roll paper.

Figure 9A:
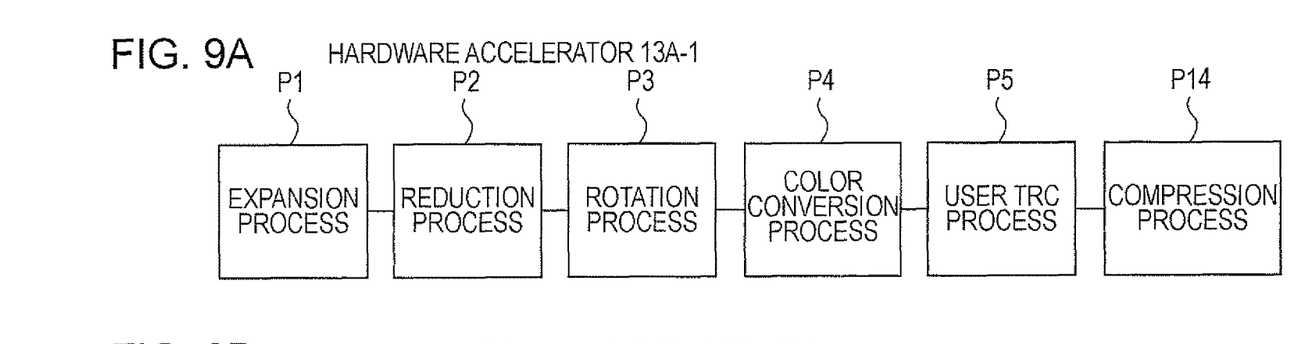
FIGS. 9A to 9C illustrate setting information during replacement of roll paper.
Figure 9B:
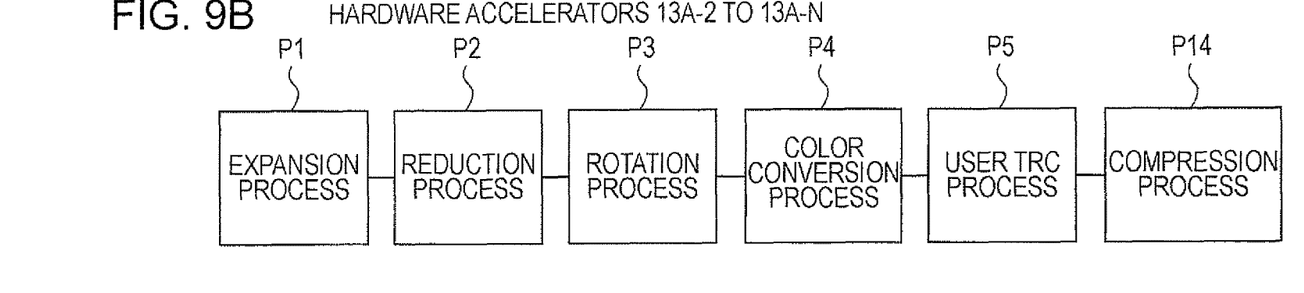
Figure 9C:
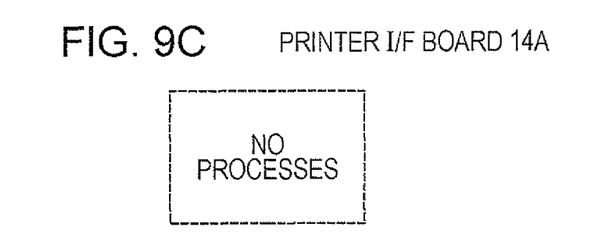
Figure 10A:
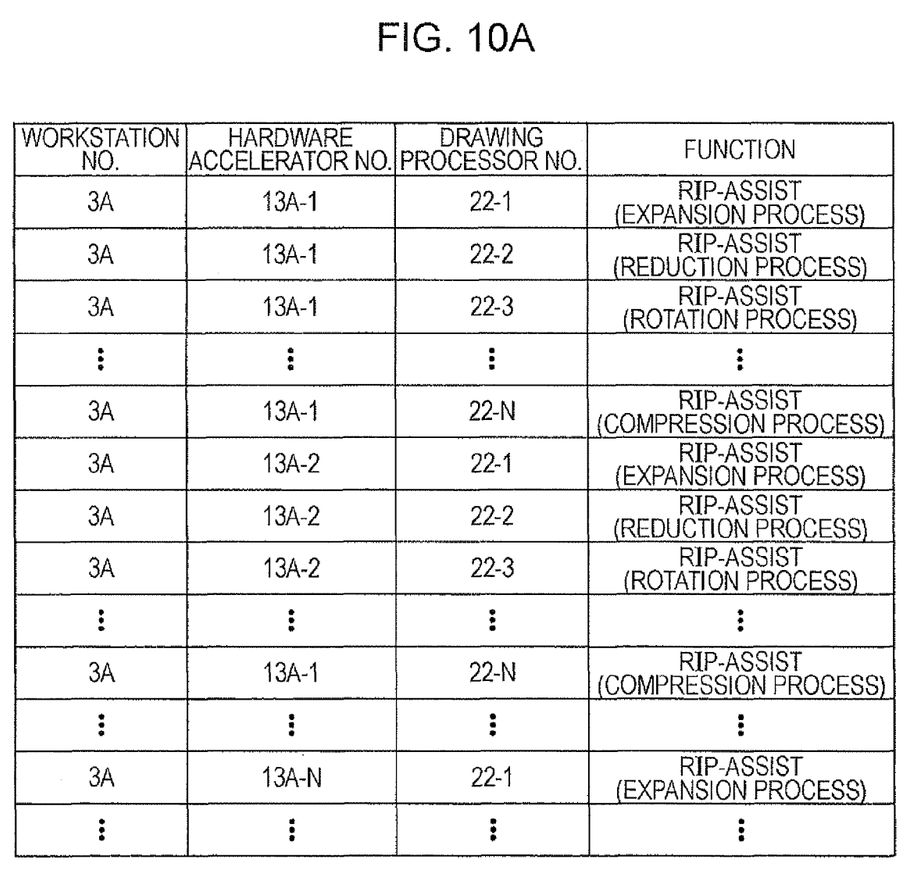
FIG. 10A is a database during replacement of roll paper.

At the time of the replacement of roll paper, the controller 11A divides the image processing operations included in the setting information illustrated in FIG. 6A into a first group including the expansion process (P1) to the user TRC process (P5) and a second group including the calibration process (P6) to the screen process (P9). Then, during the replacement of roll paper, the controller 11A changes the setting information illustrated in FIGS. 6A to 6C to setting information illustrated in FIG. 9A to 9C. At the same time, the controller 11A changes the database illustrated in FIG. 7 to a database illustrated in FIG. 10A. FIGS. 9A to 9C illustrate setting information during the replacement of roll paper, and FIG. 10A illustrates a database during the replacement of roll paper. Since a portion of the RIP-assist function and the page creation function are not executed during the replacement of roll paper, the printer I/F board 14A has no processes to execute. Therefore, as illustrated in FIG. 9C, setting information regarding the printer I/F board 14A is not present.

As illustrated in FIGS. 9A, 9B, and 10A, during the replacement of roll paper, the hardware accelerators 13A-1 to 13A-N execute the first group of image processing operations to be performed prior to the calibration process in which correction data from the printer 2A is used. That is, the image processing operations in which correction data from the printer 2A is not used are executed. Thus, since image processing is executed even during replacement of roll paper, the total processing time of image processing is reduced. Further, as illustrated in FIGS. 7 and 10A, the hardware accelerators 13A-2 to 13-N, which have executed the page creation function before the replacement of roll paper, execute the RIP-assist function during the replacement of roll paper. Therefore, the hardware accelerators 13A-2 to 13-N are effectively utilized.

A compression process (P14) illustrated in FIGS. 9A and 9B is a process for compressing image data obtained after processes from the expansion process (P1) to the user TRC process (P5) are executed and temporarily saving the compressed image data in the storage unit 12A. The compression process (P14) is optional and may not necessarily be executed.

Figure 10B:
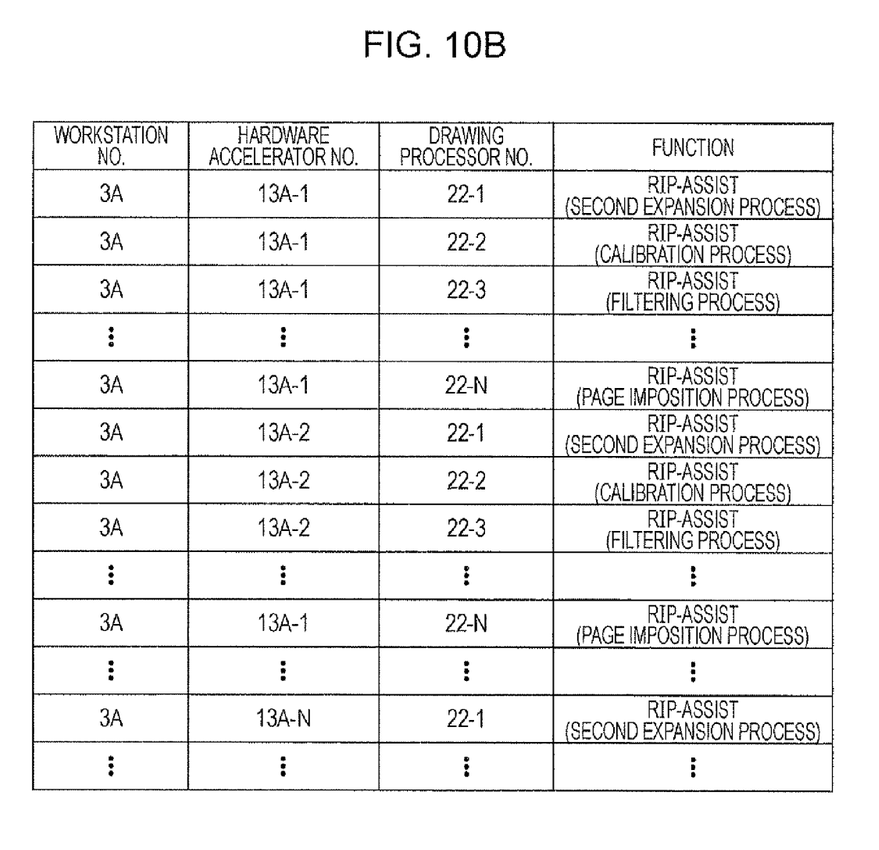
FIG. 10B is a database after replacement of roll paper.
Figure 11A:
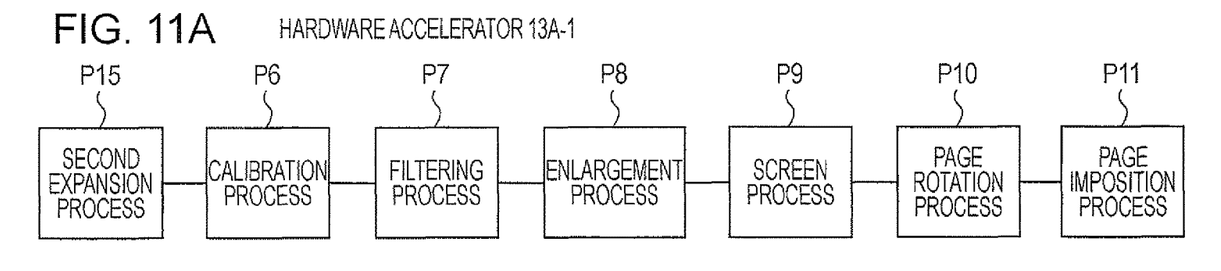
FIGS. 11A to 11C illustrate setting information after replacement of roll paper.
Figure 11B:
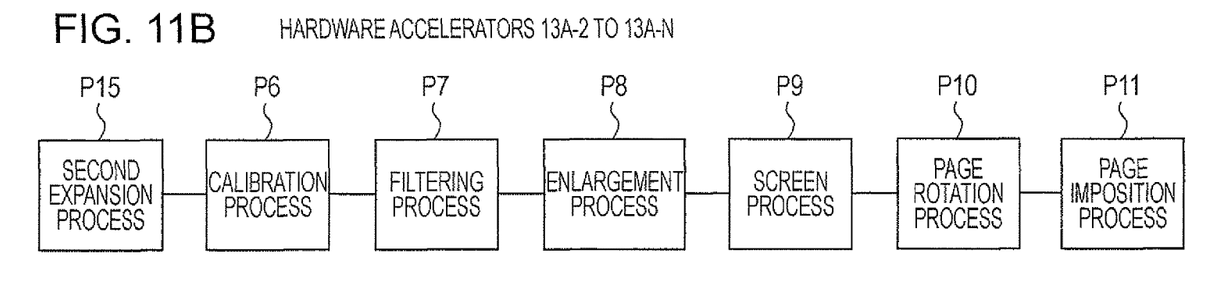
Figure 11C:
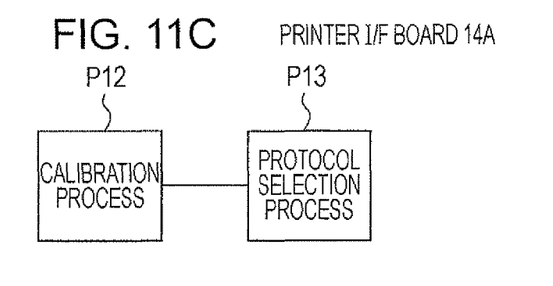

After the replacement of roll paper, the controller 11A changes the setting information illustrated in FIGS. 9A to 9C to setting information illustrated in FIG. 11A to 11C. At the same time, the controller 11A changes the database illustrated in FIG. 10A to a database illustrated in FIG. 10B. FIGS. 11A to 11C illustrate setting information after the replacement of roll paper, and FIG. 10B illustrates a database after the replacement of roll paper.

As illustrated in FIGS. 11A, 11B, and 10B, after the replacement of roll paper, the hardware accelerators 13A-1 to 13A-N execute a second expansion process (P15) for expanding the compressed image data temporarily saved in the storage unit 12A, the calibration process (P6) in which correction data from the printer 2A is used, and the remaining image processing operations. Thus, the total processing time of the image processing is shorter than that required when the hardware accelerator 13A-1 executes the RIP-assist function and the hardware accelerators 13A-2 to 13A-N execute the page creation function. Further, as illustrated in FIGS. 7 and 10B, drawing processors 22, which have executed processes from the expansion process (P1) to the user TRC process (P5) before the replacement of roll paper, execute different image processing operations after the replacement of roll paper. Thus, the drawing processors 22 are effectively utilized. It is noted that the second expansion process (P15) is executed in a case where the compression process (P14) is executed.

The hardware accelerators 13A or drawing processors 22 to be assigned to the respective image processing operations are changed in accordance with the database. However, the controller 11A may change the hardware accelerators 13A or drawing processors 22 to be assigned to the respective image processing operations in accordance with an instruction (specifically, for updating the database) from the terminal apparatus 6 or the UI 17A.

Figure 12:
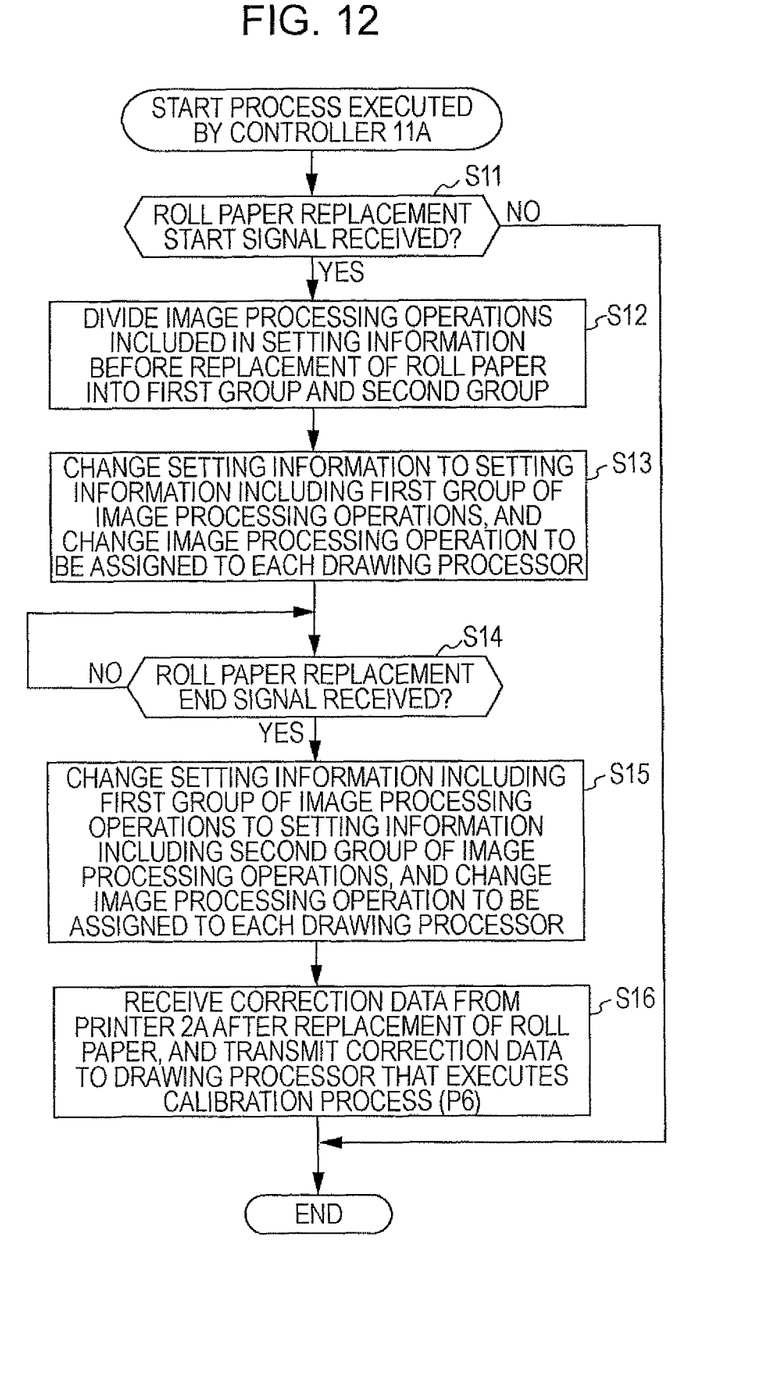
FIG. 12 is a flowchart illustrating a process executed by a controller.

FIG. 12 is a flowchart illustrating a process executed by the controller 11A. The process illustrated in FIG. 12 is also executed by the controller 11B.

First, the controller 11A determines whether or not a signal indicating the start of the replacement of roll paper has been received from the terminal apparatus 6 or the UI 17A (step S11). Alternatively, the controller 11A may calculate the timing at which the replacement of roll paper starts using a print job and the residue of the roll paper, and may determine, when the calculated start timing has elapsed, that a signal indicating the start of the replacement of roll paper has been received.

If NO is determined in step S11, the process ends. If YES is determined in step S11, the controller 11A divides the image processing operations included in the setting information obtained before the replacement of roll paper (FIG. 6A) into a first group including the expansion process (P1) to the user TRC process (P5) and a second group including the calibration process (P6) to the screen process (P9) (step S12). Then, the controller 11A changes the setting information obtained before the replacement of roll paper to first setting information including the first group of image processing operations (that is, the setting information during the replacement of roll paper), and also changes an image processing operation to be assigned to each drawing processor in accordance with the database illustrated in FIG. 10A (step S13). Specifically, the controller 11A changes the setting information illustrated in FIGS. 6A to 6C to the setting information illustrated in FIGS. 9A to 9C, and changes the database illustrated in FIG. 7 to the database illustrated in FIG. 10A. Therefore, each drawing processor executes the image processing operation assigned thereto in accordance with the setting information during the replacement of roll paper.

Then, the controller 11A determines whether or not a signal indicating the end of the replacement of roll paper has been received from the terminal apparatus 6 or the UI 17A (step S14). If NO is determined in step S14, the determination is repeated. If YES is determined in step S14, the controller 11A changes the first setting information to second setting information including the second group of image processing operations (that is, the setting information after the replacement of roll paper), and also changes an image processing operation to be assigned to each drawing processor in accordance with the database illustrated in FIG. 10B (step S15). Specifically, the controller 11A changes the setting information illustrated in FIGS. 9A to 9C to the setting information illustrated in FIGS. 11A to 11C, and changes the database illustrated in FIG. 10A to the database illustrated in FIG. 10B. Therefore, each drawing processor executes the image processing operation assigned thereto in accordance with the setting information after the replacement of roll paper.

The controller 11A receives correction data from the printer 2A after the replacement of roll paper, and transmits the correction data to a drawing processor 22 that executes the calibration process (P6) (step S16). Thus, a drawing processor 22 that executes the calibration process (P6) performs tone correction of image data using the correction data from the printer 2A after the replacement of roll paper. The printer I/F board 14A receives in real time the correction data from the printer 2A after the replacement of roll paper, and executes the calibration process (P12).

As described above, according to the exemplary embodiment, if replacement of roll paper occurs, the time required to restart image formation after the replacement of roll paper may be reduced. Further, since image processing operations that are executed after the replacement of roll paper are not executed using correction data from the printer 2A before the replacement of roll paper, a color difference (difference in color density) between output images before and after the replacement of roll paper may be reduced.

In another exemplary embodiment, a recording medium on which a program of software for implementing the functions of the workstation 3A is recorded may be supplied to the workstation 3A, and the controller 11A may read and execute the program stored in the recording medium. Examples of the recording medium through which the program is supplied include a compact disc read only memory (CD-ROM), a digital versatile disc (DVD), and a Secure Digital (SD) card.

In another exemplary embodiment, furthermore, the workstation 3A may execute the program of software for implementing the functions of the workstation 3A.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
    a first dynamic reconfigurable processor assigned to a first group of image processing operations, the first group of image processing operations being executed regardless of whether or not correction data from a printer is used;
    a second dynamic reconfigurable processor assigned to a second group of image processing operations, the second group of image processing operations being executed using correction data from the printer; and
    a controller that performs control to execute the first group of image processing operations during interruption of operation of the printer by changing an image processing setting so as to cause the second dynamic reconfigurable processor assigned to the second group of image processing operations to execute the first group of image processing operations.

2. The image processing apparatus according to claim 1, wherein the controller performs control to execute the second group of image processing operations after the operation of the printer is restarted, using image data on which the first group of image processing operations has been executed during the interruption of the operation of the printer, by changing the image processing setting so as to cause the second dynamic reconfigurable processor that has been assigned to the first group of image processing operations during the interruption of the operation of the printer to execute the second group of image processing operations.

3. The image processing apparatus according to claim 1, wherein the interruption of the operation of the printer includes interruption in order to replace continuous paper.

4. The image processing apparatus according to claim 2, wherein the interruption of the operation of the printer includes interruption in order to replace continuous paper.

5. An image forming apparatus comprising:
    the image processing apparatus according to claim 1; and
    a printer that prints a print job processed by the image processing apparatus.

6. A non-transitory computer readable medium storing a program causing a computer to execute a process, the process comprising:
    assigning a first dynamic reconfigurable processor to a first group of image processing operations, the first group of image processing operations being executed regardless of whether or not correction data from a printer is used;
    assigning a second dynamic reconfigurable processor to a second group of image processing operations, the second group of image processing operations being executed using correction data from the printer; and
    performing control to execute the first group of image processing operations during interruption of operation of the printer by changing an image processing setting so as to cause the second dynamic reconfigurable processor assigned to the second group of image processing operations to execute the first group of image processing operations.

* * * * *